June 14, 1927.
G. WIRRER
1,631,996
FINAL DRIVE FOR VEHICLES
Filed March 11, 1925
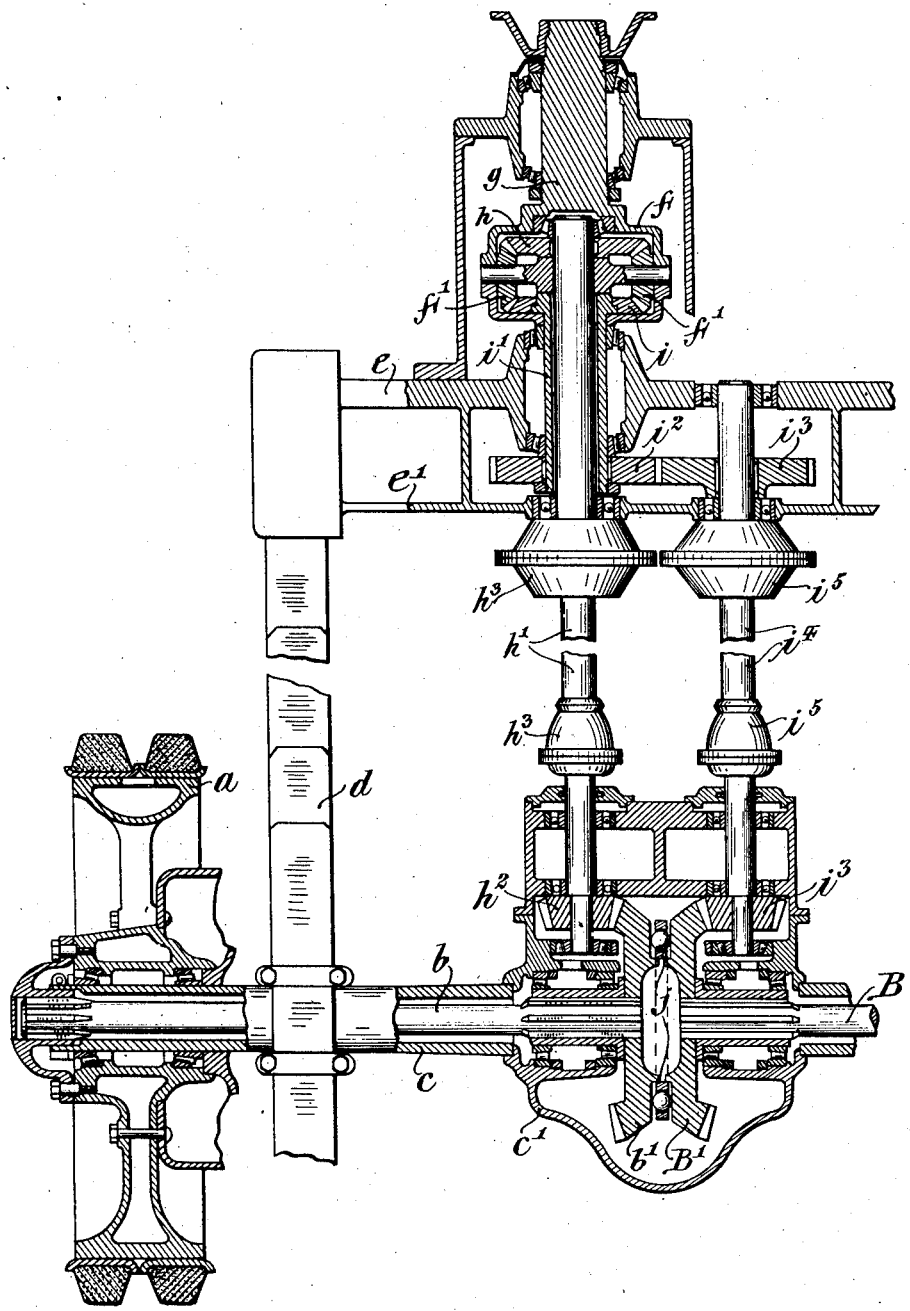
Inventor
Gottfried Wirrer
By his Attorneys Redding, Greeley, O'Shea & Campbell Patented June 14, 1927.

1,631,996

UNITED STATES PATENT OFFICE.

GOTTFRIED WIKRER, OF PLAINFIELD, NEW JERSEY, ASSIGNOR TO INTERNATIONAL MOTOR COMPANY, OF NEW YORK, N. Y., A CORPORATION OF DELAWARE.

FINAL DRIVE FOR VEHICLES.

Application filed March 11, 1925. Serial No. 14,629.

This invention has to do with driving mechanism in motor vehicles adapted to deliver a large amount of power to the rear driving axle without over-taxing the gearing in the final drive. Experience has demonstrated that it is not feasible to deliver more than sixty or seventy horse power through a single bevel gear to the master gear of the differential carried on the rear axle, as in usual constructions, in the sizes and diameters practical in the final drives of motor vehicles to secure adequate ground clearance because the lateral thrust on the final drive pinion and the master gear of the differential results in such reaction at the point where the drive pinion engages the ring gear as to cause breakage of teeth especially under heavy loads when the alignment is not exactly correct. The dual reduction type of axle in which the final driving is done by a large spur gear has been resorted to on heavy duty motor vehicles such as buses driven at high speed but this involves additional unsprung weight on the axle. It is an object of the present invention to provide a final drive for motor vehicles which shall eliminate the excessive thrust upon the driving gears while at the same time permitting the use of a prime mover delivering power in greater degree than has heretofore been deemed practical. Accordingly power dividing means such as differential gearing is carried by the chassis. The propeller shaft drives a differential gear and the power is divided by it and distributed to independent live axle sections upon which the respective driving wheels are mounted. More particularly the propeller shaft causes the revolution of a housing carrying the planetary pinions of the differential and these pinions engage a bevel gear keyed to a shaft which extends to one of the live axle sections and is operatively connected thereto through a bevel pinion meshing with a final drive pinion carried with the axle. The planetary pinions also mesh with a bevel gear carried with a sleeve concentric with the shaft and carrying a spur gear which meshes with a spur gear carried with a shaft extending rearwardly to the other live axle section and is operatively connected thereto by a gearing similar to the connection between the first named shaft and the live axle section driven thereby. The bevel pinions carried with the inner ends of the respective live axle sections are so separated that the reaction between the respective final dive pinions is mutually resisted. In the preferred embodiment they are arranged back to back and suitable bearings interposed directly between them.

The invention will now be described in greater detail in connection with the accompanying drawing, illustrating in horizontal plan and partly in section, a preferred embodiment thereof in which power dividing means is shown as carried upon the chassis frame and this power is transmitted by appropriate shafting and gearing to live axle members.

One of the driving wheels $a$ of a motor vehicle is illustrated as carried with the end of a live axle section $b$ rotatable within the dead axle $c$ from which the chassis of the vehicle is supported by the usual springs, a fragmentary portion of which is illustrated at $d$. Mounted in any convenient manner upon cross members $e$, $e'$ of the chassis frame is a differential gearing comprising a housing $f$ adapted to be rotated by the propeller shaft $g$ and carrying planetary pinions $f'$ which mesh with a bevel gear $h$ carried with a shaft $h'$ extending rearwardly to the live axle $b$, suitably supported in bearings in the housing $c'$ forming the mid-portion of the dead axle $c$. Carried on the shaft $h'$ is a bevel pinion $h^2$ meshing with a bevel pinion $b'$ keyed to the live axle section $b$.

Bevel pinions $f'$ also mesh with a bevel gear $i$ carried with a sleeve $i'$ concentric with the shaft $h$. The sleeve $i'$ has keyed or otherwise rigidly secured thereto a spur gear $i^2$ meshing with a spur gear $i^3$ carried with a shaft $i^4$ also extending rearwardly to the other live axle section B carried with the driving wheel upon the opposite side of the vehicle (not shown). Live axle section B has keyed thereto a bevel gear B' which is in mesh with a bevel pinion $i^5$ carried in similar manner to the bevel pinion $h^2$ on the shaft $h'$.

Suitable universal joints may be disposed in the length of the shafts $h'$ and $i^4$, respectively, as indicated at $h^3$ and $i^5$.

By the construction described the driving torque transmitted by the propeller shaft $g$ is divided by means of the differential $f$ and the spur gears $i^2$, $i^3$ and transmitted, assuming the ratio of the spur gears to be 1—1, in equal proportion to the live axle sections $b$, B.

It will be observed from an inspection of the drawings that the final bevel gears $b'$ B' are carried with the ends of the axles $b$, B in opposed relation and a thrust bearing $j$ is disposed therebetween. Reaction between the final drive pinion $h^2$ and its bevel gear $b'$ and between the final drive pinion $i^3$ and its bevel gear B' is mutually resisted through the interposed thrust bearing $j$.

It will, of course, be understood that the differential gearing carried with the chassis frame is disposed within a suitable housing and that suitable bearings for the shafts $h'$ and $i^4$ are provided upon the chassis frame and housing $c'$, respectively. These may take any form and no limitation is intended by the arrangement illustrated in the drawing.

By mounting the differential upon the chassis frame the rear axle is relieved from considerable unsprung weight. By the construction illustrated each of the axle sections is subjected to only half of the total power developed by the prime mover. As a consequence, for instance, the vehicle may be equipped with an engine of say 150 horsepower and only 75 horse power will be directed to each of the live axle sections and the gearing associated therewith. The gearing is thus subjected to only that degree of driving torque which it is able to withstand.

Various modifications may be made in the form and disposition of the co-operating elements going to form the present invention. For instance a chain drive might readily be substituted for the respective shafts $h'$ and $i^4$ to transmit the drive from the power dividing unit to the respective live axle section. No limitation is intended by the specification or drawings appended hereto except as indicated in the annexed claims.

What I claim is:

1. In a motor vehicle having a chassis frame, the combination with a pair of live axle sections and a propeller shaft, of differential gearing carried with the chassis frame and having two driving elements, means to drive the driving elements of the differential from the propeller shaft, a longitudinally extending shaft, a sleeve concentric with the shaft, a second longitudinally extending shaft, operative connections between the first named longitudinally extending shaft and one element of the differential, operative connections between the sleeve and the other element of the differential, operative connections between said sleeve and the second named longitudinally extending shaft, bevel gearing connecting said first named longitudinally extending shaft and one of the live axle sections and opposed bevel gearing connecting said second named longitudinally extending shaft and the other of the live axle sections, and a single thrust bearing to oppose the thrusts on the gearing on the live axle sections.

2. In a motor vehicle having a chassis frame, the combination with a pair of live axle sections and a propeller shaft, of differential gearing carried with the chassis frame and comprising a housing, means to rotate the housing from the propeller shaft, planetary pinions carried with the housing, a longitudinally extending shaft, a bevel gear carried with the shaft and meshing with the planetary pinions, a sleeve concentric with the shaft, a bevel gear carried with the sleeve and meshing with the planetary pinions, a spur gear carried with the sleeve, a second longitudinally extending shaft, a spur gear carried with the second shaft and meshing with the first named spur gear, bevel pinions carried with the ends of the longitudinally extending shafts, bevel gears carried with the live axle sections and meshing with said bevel pinions, respectively, and a thrust bearing between the last named beveled gears.

This specification signed this 6th day of March A. D. 1925.

GOTTFRIED WIRRER.